United States Patent [19]
Bechade

[11] Patent Number: 5,905,428
[45] Date of Patent: May 18, 1999

[54] N-BIT COMPARATOR USING COUNT LEADING 1 CIRCUITS

[75] Inventor: Roland A. Bechade, Somerville, N.J.

[73] Assignee: International Business Machines Corporation, Armonk, N.Y.

[21] Appl. No.: 08/893,079

[22] Filed: Jul. 15, 1997

[51] Int. Cl.[6] .................................................. G05B 1/00
[52] U.S. Cl. ........................................................ 340/146.2
[58] Field of Search ........................................... 340/146.2

[56] References Cited

U.S. PATENT DOCUMENTS

| | | | |
|---|---|---|---|
| 3,938,087 | 2/1976 | Louie | 340/146.2 |
| 4,225,849 | 9/1980 | Lai | 340/146.2 |
| 4,648,059 | 3/1987 | Gregorcyk | 364/769 |
| 4,903,005 | 2/1990 | Sakashita et al. | 340/146.2 |
| 5,018,099 | 5/1991 | Burrows | 365/49 |
| 5,379,420 | 1/1995 | Ullner | 340/146.2 |
| 5,450,056 | 9/1995 | Jens | 340/146.2 |
| 5,534,844 | 7/1996 | Norris | 340/146.2 |
| 5,586,288 | 12/1996 | Dahlberg | 340/146.2 |
| 5,689,228 | 11/1997 | Yetter et al. | 340/146.2 |

*Primary Examiner*—Margaret R. Wambach
*Attorney, Agent, or Firm*—Whitham, Curtis, Whitham; Eugene Shkurko

[57] ABSTRACT

An apparatus and method for comparing values A comparator comprising inputting two comparison values to be compared, determining the number of a leading "1" in each of the values and outputting two position values, wherein the position values have a bit size smaller than the comparison values, comparing a first position value of the position values from a second position value of the position values, and outputting a signal indicating a first comparison value of the comparison values is either greater than a second comparison value of the comparison values, equal to the second comparison value or less than the comparison value, based on a result of the comparing operation.

20 Claims, 9 Drawing Sheets

COUNT LEADING 1

| BINARY B4B3B2B1B0 | DECIMAL | I 15 | I 14 | I 13 | I 12 | I 11 | I 10 | I 09 | I 08 | I 07 | I 06 | I 05 | I 04 | I 03 | I 02 | I 01 | I 00 |
|---|---|---|---|---|---|---|---|---|---|---|---|---|---|---|---|---|---|
| 0 0 0 0 0 | 0 | 0 | | | | | | | | | | | | | | | |
| 0 0 0 0 1 | 1 | 1 | 0 | | | | | | | | | | | | | | |
| 0 0 0 1 0 | 2 | 1 | 1 | 0 | | | | | | | | | | | | | |
| 0 0 0 1 1 | 3 | 1 | 1 | 1 | 0 | | | | | | | | | | | | |
| 0 0 1 0 0 | 4 | 1 | 1 | 1 | 1 | 0 | | | | | | | | | | | |
| 0 0 1 0 1 | 5 | 1 | 1 | 1 | 1 | 1 | 0 | | | | | | | | | | |
| 0 0 1 1 0 | 6 | 1 | 1 | 1 | 1 | 1 | 1 | 0 | | | | | | | | | |
| 0 0 1 1 1 | 7 | 1 | 1 | 1 | 1 | 1 | 1 | 1 | 0 | | | | | | | | |
| 0 1 0 0 0 | 8 | 1 | 1 | 1 | 1 | 1 | 1 | 1 | 1 | 0 | | | | | | | |
| 0 1 0 0 1 | 9 | 1 | 1 | 1 | 1 | 1 | 1 | 1 | 1 | 1 | 0 | | | | | | |
| 0 1 0 1 0 | 10 | 1 | 1 | 1 | 1 | 1 | 1 | 1 | 1 | 1 | 1 | 0 | | | | | |
| 0 1 0 1 1 | 11 | 1 | 1 | 1 | 1 | 1 | 1 | 1 | 1 | 1 | 1 | 1 | 0 | | | | |
| 0 1 1 0 0 | 12 | 1 | 1 | 1 | 1 | 1 | 1 | 1 | 1 | 1 | 1 | 1 | 1 | 0 | | | |
| 0 1 1 0 1 | 13 | 1 | 1 | 1 | 1 | 1 | 1 | 1 | 1 | 1 | 1 | 1 | 1 | 1 | 0 | | |
| 0 1 1 1 0 | 14 | 1 | 1 | 1 | 1 | 1 | 1 | 1 | 1 | 1 | 1 | 1 | 1 | 1 | 1 | 0 | |
| 0 1 1 1 1 | 15 | 1 | 1 | 1 | 1 | 1 | 1 | 1 | 1 | 1 | 1 | 1 | 1 | 1 | 1 | 1 | 0 |
| 1 0 0 0 0 | 16 | 1 | 1 | 1 | 1 | 1 | 1 | 1 | 1 | 1 | 1 | 1 | 1 | 1 | 1 | 1 | 1 |

A+A XNOR B

FIG.3B

B + A XNOR B

| B2 | ODA 4-7, ODA 0-3 | | | |
|---|---|---|---|---|
| ODA 12-15, ODA 8-11 | 00 | 01 | 11 | 10 |
| 00 | 0 | 0 | 0 | 0 |
| 01 | 0 | 0 | 0 | 0 |
| 11 | 0 | 0 | 0 | 1 |
| 10 | 1 | 1 | 1 | 1 |

N-BIT COMPARATOR USING COUNT LEADING 1 CIRCUITS

BACKGROUND OF THE INVENTION

1. Field of the Invention

The present invention generally relates to comparators used in computer and other systems.

2. Description of the Related Art

In a microprocessor it is often necessary to compare two values (A and B) to determine if A is greater than B, B is greater than A or A is equal B. For example, in microprocessors with cache units it is necessary to check if the address of the data or instruction to be fetched is in the cache. To do so the address has to be compared with the upper and lower limits of an address range.

Conventional comparators subtract A from B and determine if the subtraction results in a zero by observing whether a carry-out occurs at the most significant bit of the result. This approach requires a entire adder, even if sum bits are not used. Since speed is critical a look ahead adder or a carry select adder is sometimes used. Such adders increase the size (i.e., area requirement) of the conventional comparator.

SUMMARY OF THE INVENTION

It is, therefore, an object of the present invention to provide a comparator that uses count leading "1" circuits to reduce the size of the field being compared, thereby reducing the area requirement for the adder within the comparator.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention comprises a comparing method and a comparator that uses count leading "1" circuits to reduce the size of the comparator.

The comparator described below first determines the position of a leading "1" of inputs A and B and converts this position into a binary number for A and B. The leading "1" is the first occurrence of the number "1" followed by a "0" within each of the inputs. The binary numbers are then compared with the conventional components of the comparator.

The size of the binary number is substantially less than that of the input values A and B. By reducing the number of bits being compared, the size of the comparator can be reduced, saving time and chip area. For instance, for a 16 bit input field, the binary number indicating the position of the leading "1" will be a 5 bit field.

More specifically, with the invention, the input data A and B are modified into A' and B', bit by bit, based on the equations A'=A+A XNOR B and B'=B+A XNOR B (where "+" means the logical OR operation). The position of the leading "1" within each of the modified values is determined and compared to the other modified value. The following chart graphically illustrates this operation.

| Column | I | II | III | IV | V | VI | VII |
|---|---|---|---|---|---|---|---|
| A | 0000 | 1000 | 0100 | 1111 | 0111 | 0001 | 0011 |
| B | 0100 | 0100 | 0100 | 0100 | 0100 | 0100 | 0100 |
| A XNOR B | 1011 | 0011 | 1111 | 0100 | 1100 | 1010 | 1000 |
| A' | 1011 | 1011 | 1111 | 1111 | 1111 | 1011 | 1011 |
| B' | 1111 | 0111 | 1111 | 0100 | 1100 | 1110 | 1100 |
| CL1 A' | 1 | 1 | 4 | 4 | 4 | 1 | 1 |
| CL1 B' | 4 | 0 | 4 | 0 | 2 | 3 | 2 |
| | B > A | A > B | A = B | A > B | A > B | B > A | B > A |

A and B represent various 4-bit input values. The exclusive NOR function ("XNOR") outputs a low signal (i.e., a "0") only when the two inputs are different.

For example in column I, the first bit of value A is "0" and the first bit of value B is "0". Since these values are the same, the XNOR function outputs a "1", as indicated in the first bit of the value on the "A XNOR B" row of column I.

The result of the XNOR function is ORed back to the original A and B inputs to arrive at the modified A' and B' values shown above.

The position (or number) of the leading "1"'s within each of the modified values A' and B' is determined and shown in the rows labeled "CL1 A'" and "CL1 B'". For example, in column I, the A' value "1011" has a leading "1" in the first bit position. Therefore, CL1 A' identifies this position with the value "1". Similarly, in column I, the B' value "1111" has four leading "1"'s. Thus, CL1 B' identifies this position with the value "4".

A comparison of CL1 A' and CL1 B' illustrates that B is greater than A (i.e. B>A), as shown above.

The modification to the input data allows the invention to differentiate between two values even where the leftmost one's are in the same bit position. The invention corrects the data when the input bits are equal at the same bit position. The first zero from the left bit will identify the smaller number.

Figure 1:
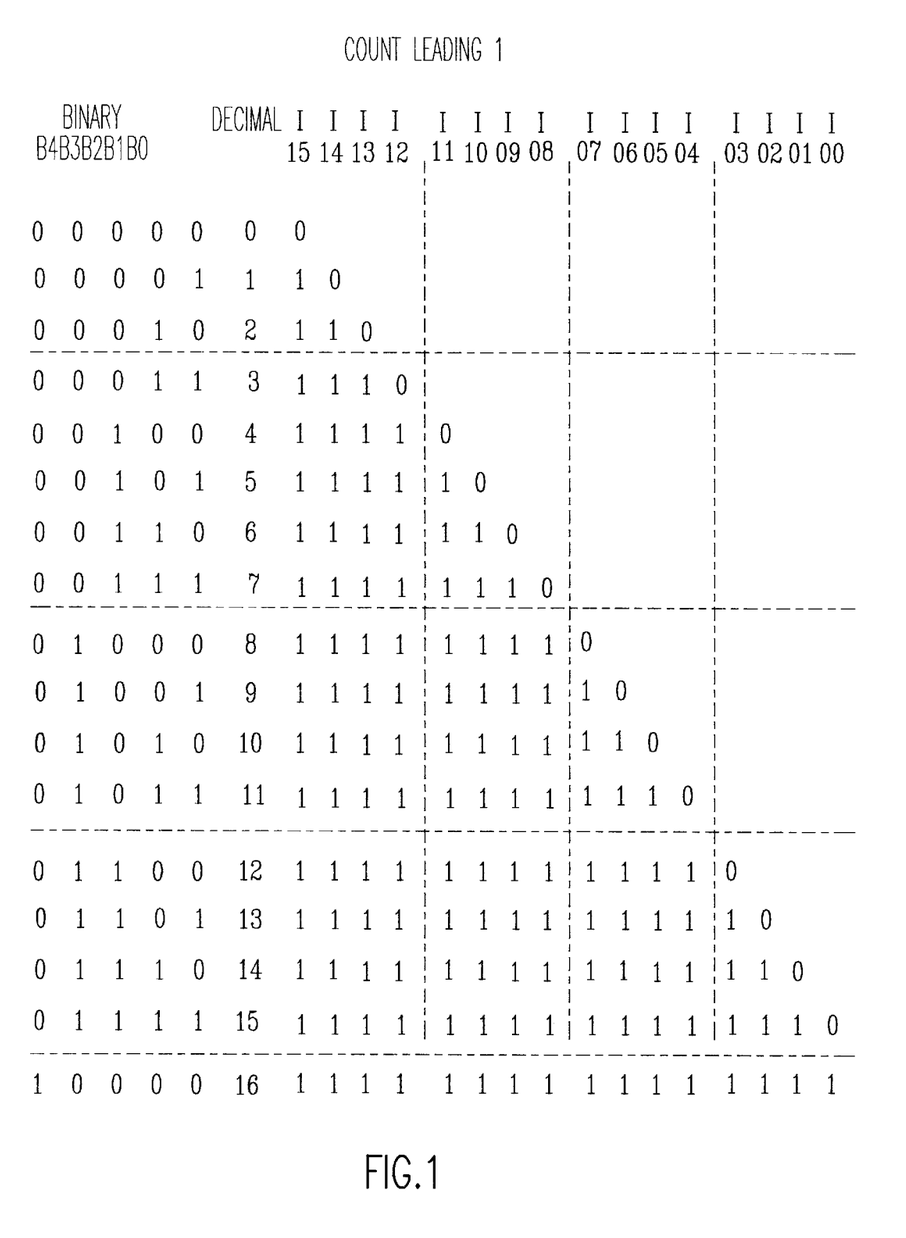
FIG. 1 is a chart illustrating the leading "1" values for a 16-bit value.

Referring now to the drawings, the leading "1" values for a 16-bit value are illustrated in FIG. 1. As illustrated in the "Binary" column, the number of bits can be reduced from 16 to 5, which allows a substantially smaller comparator to be used.

Figure 2:
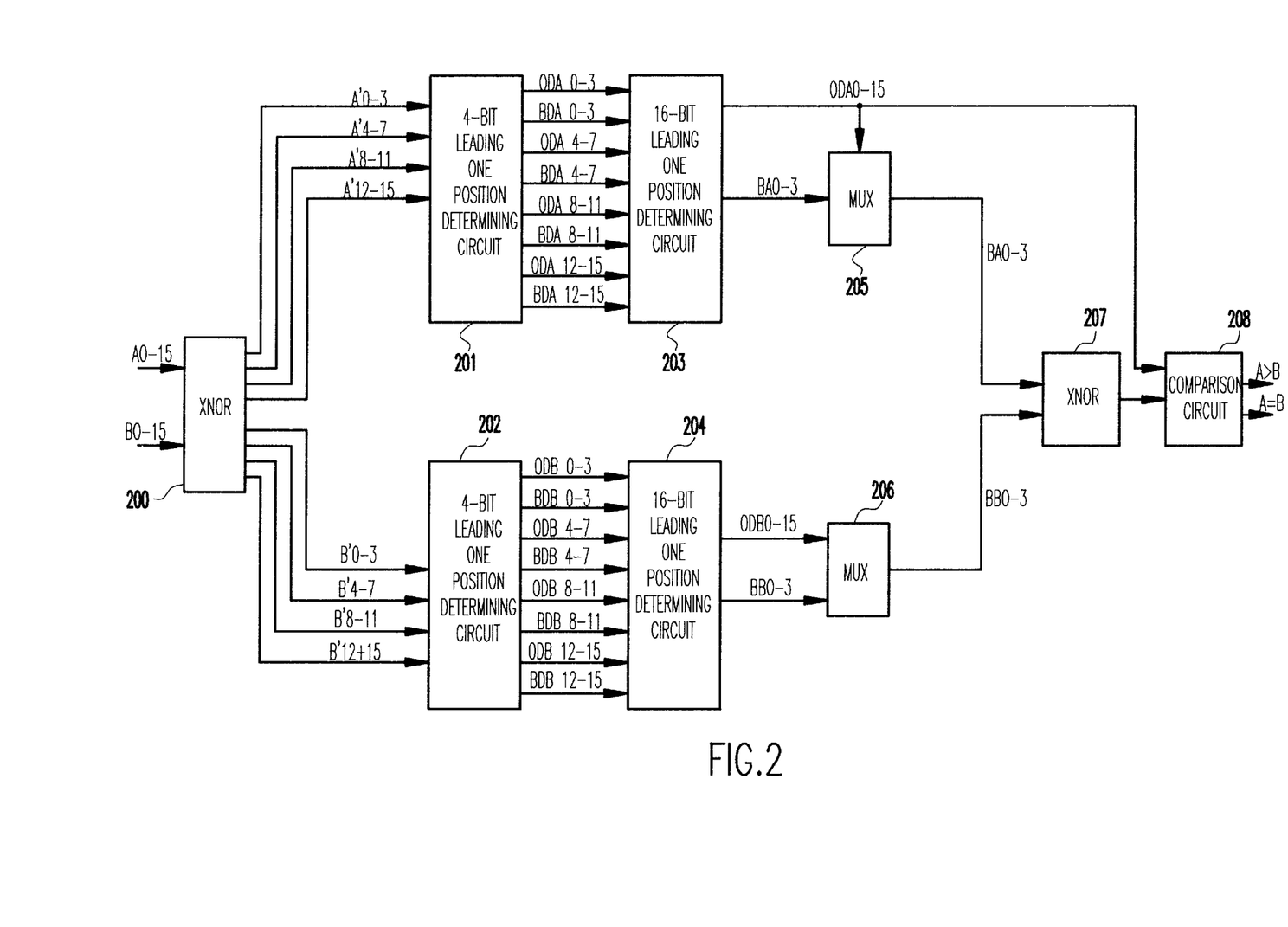
FIG. 2 is schematic block diagram of a comparator circuit according to the invention.

In FIG. 2, the inventive comparator is illustrated. More specifically, FIG. 2 shows a circuit 200 which comprises means for modifying the 16-bit input values from A and B to A' and B', based on the equation, A'=A+A XNOR B and B'=B+A XNOR B, as discussed above. Circuit 200 is illustrated in greater detail in FIG. 3A, discussed below. The modified values are output from circuit 200 in 4-bit segments to circuits 201 and 202 as outputs A'0–3, A'4–7 . . . B'12–15.

Circuits 201 and 202 comprise means for determining a bit position of the leading "1" in each of the 4-bit segments of the modified input values A' and B' as a binary number. Circuits 201 and 202 output these values as, for example, signal "BDA 0–3" (which represents the first 4 bits of the Binary Digit of "A"). The remaining signals are similarly labeled "BDA 4–7, BDA 8–12 . . . BDB 12–15" and are output to circuits 203 and 204. The specific circuits which make up the bit position determining means are further illustrated in FIGS. 4A and 5A, discussed below.

Figure 6:
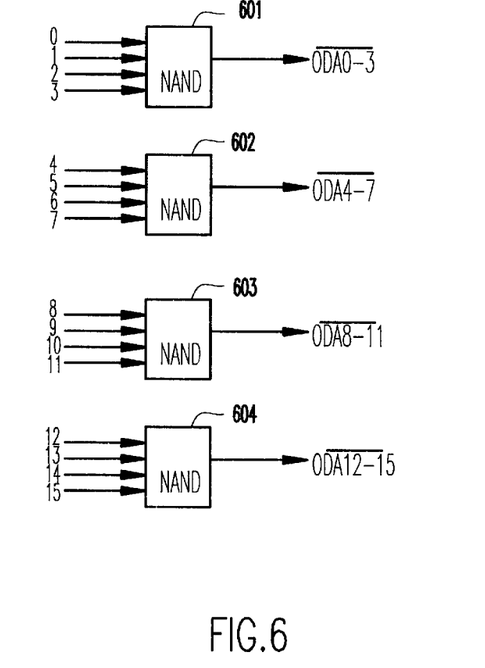
FIG. 6 is schematic block diagram of a circuit for determining whether an all "1" condition exists in 4-bit values according to the invention.

Circuits 201 and 202 also comprise means for determining whether any of the 4-bit segments includes all "1" values. For example, circuits 201 and 202 output a signal ODA 0–3 (which represents the "One Detect" for bits 0–3 of value A'). Circuits 201 and 202 similarly output signals "ODA 4–7, ODA 8–12 . . . ODB 12–15" representing the result of the one detection operation to circuits 203 and 204. The circuit for performing the one detection operation is illustrated in FIG. 6, discussed below.

Figure 7:
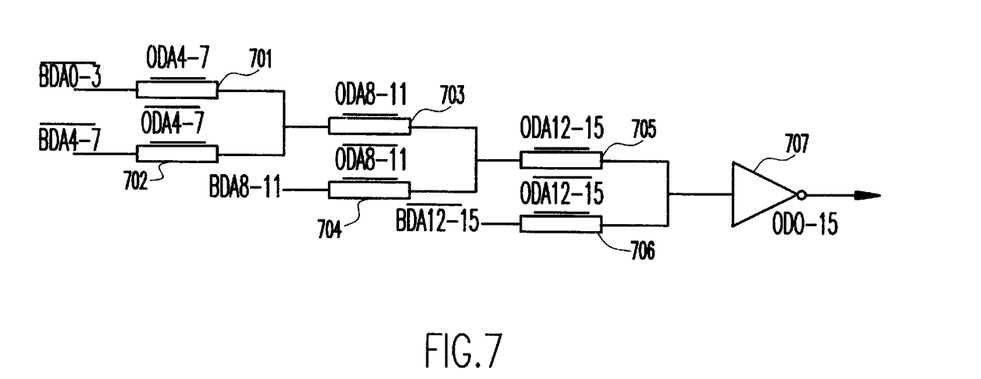
FIG. 7 is schematic block diagram of a circuit for determining whether an all "1" condition exists in 16-bit values according to the invention.

Circuits 203 and 204 also comprise means for determining if the entire modified 16-bit value includes "all ones" and output this as signal "OD 0–15" to circuits 205 and 206. The circuit for performing the one detection operation is illustrated in FIG. 7, discussed below.

Circuits 203 and 204 also comprise means for determining a bit position of the leading "1" in the 16-bit input values A' and B' as a binary number. Circuits 203 and 204 output the selected leading "1" values as signals "BA0–3" and "BB0–3" to circuits 205 and 206. The circuits for performing this selection are illustrated in detail in FIGS. 8A and 9A, discussed below.

Circuits 205 and 206 comprise means for switching, such as 2-way multiplexer circuits, which compensate for the situation where the entire modified 16-bit value is "all ones." Circuits 205 and 206 normally pass the "BA0–3" and "BB0–3" signals to circuit 207 without modification. However, if all the modified 16-bit values are "all ones" (as indicated by the OD 0–15 signal from circuits 203 and 204), the multiplexer circuits 205 and 206 will change the "BA0–3" and "BB0–3" signals to all zero indicating that all bits are "1". As shown in FIG. 1, if all the bits are "1", B0–B3 are all zero. This is done to simplify the generation of bit B3 to B0 in the previous stages.

Circuit 207 is identical in function to circuit 200 and modifies the values "BA 0–3" and "BB 0–3" based on the equation A'=A+A XNOR B and B'=B+A XNOR B, discussed above, and outputs "BA'0–3", "BB'0–3" and B'0–3 to circuit 208. This second modification is necessary to differentiate two numbers when the leftmost ones occur in the same bit position in both numbers.

Figure 10A:
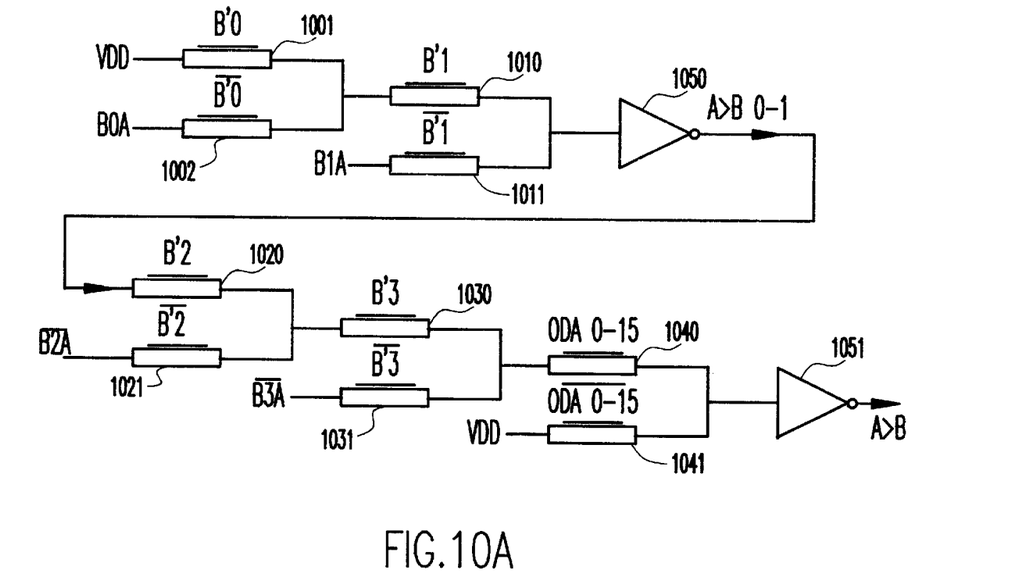
FIG. 10A is a schematic block diagram of a circuit for determining whether a one value is greater than another value according to the invention.
Figure 10B:
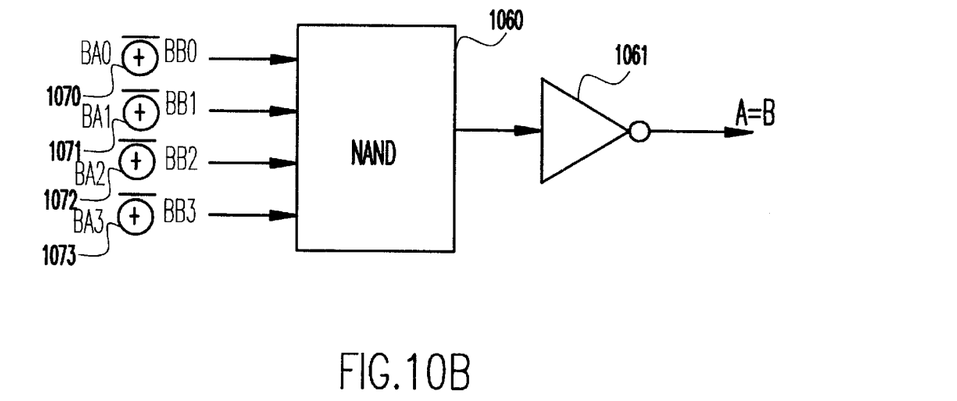
FIG. 10B is a schematic block diagram of a circuit for determining whether a one value is equal to another value according to the invention.

Circuit 208 comprises means for determining the relative values of "BA'0–3" and "BB'0–3". Specifically circuit 208 determines whether "BA'0–3" is greater than, equal to or less than "BB'0–3" and outputs an "A>B" signal and an "A=B" signal. A low signal on both the "A>B" and the "A=B" signals indicates a condition where "B>A." The details of circuit 208 is illustrated in FIGS. 10A and 10B.

Figure 3A:
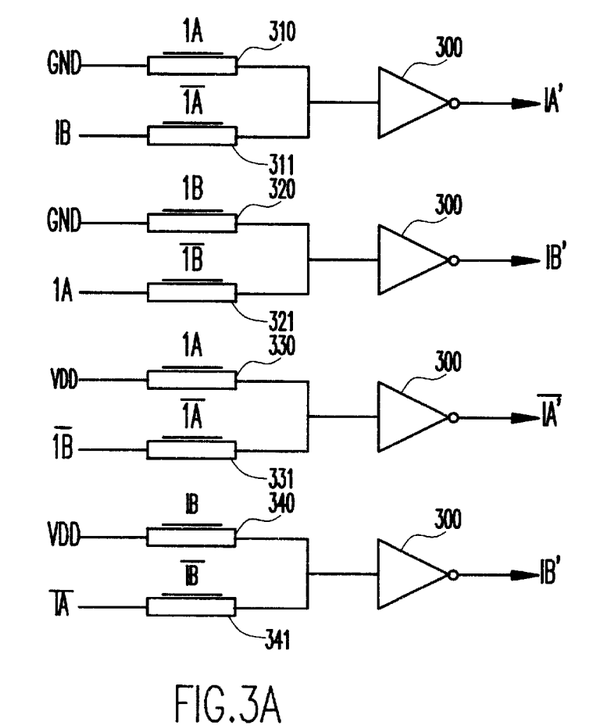
FIG. 3A is schematic block diagram of a circuit for determining the bit position of a leading "1" according to the invention.

FIG. 3A illustrates a circuit used for modifying the input data A and B to A' and B', on a bit by bit basis, to satisfy the equation A'=A+A XNOR B and B'=B+A XNOR B.

Pairs of transistors 310, 311; 320, 321; 330, 331; and 340, 341 alternatively allow signals to pass, depending upon the value of a given bit position of the values A and B. The transistors illustrated in the Figures allow a signal to pass from the source to the drain when a high signal is applied to the gate.

More specifically, transistor 310 allows a ground signal GND (i.e., "0") to pass when the given bit of the A value IA is high (i.e. "1"). To the contrary, transistor 310 allows the given bit of the B value IB to pass when the complement of IA is high (i.e., when IA is low, "0"). The complement of the values is illustrated with a bar above the value in the drawings.

Similarly, transistors 320, 321 allow either the ground or the IA value to pass depending upon whether IB is high or low. Transistors 330, 331 alternatively allow a high voltage signal VDD (i.e., "1") or the complement of the IB signal to pass depending upon the IA value. Transistors 340, 341 allow a high signal or the complement of the IA signal to pass depending upon the IB value.

Figure 3B:
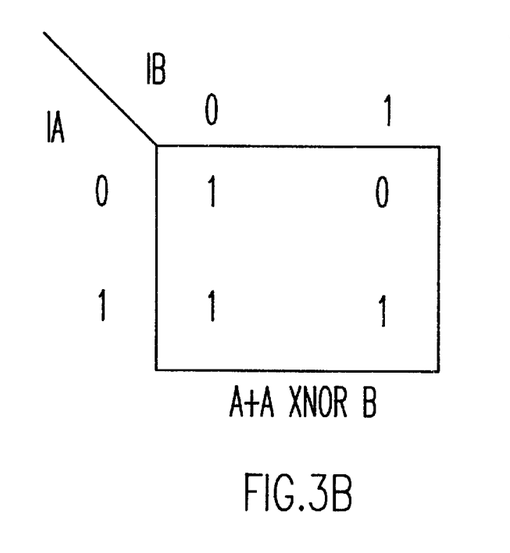
FIG. 3B is a truth table illustrating various outputs of the circuit shown in FIG. 3A given various inputs.
Figure 3C:
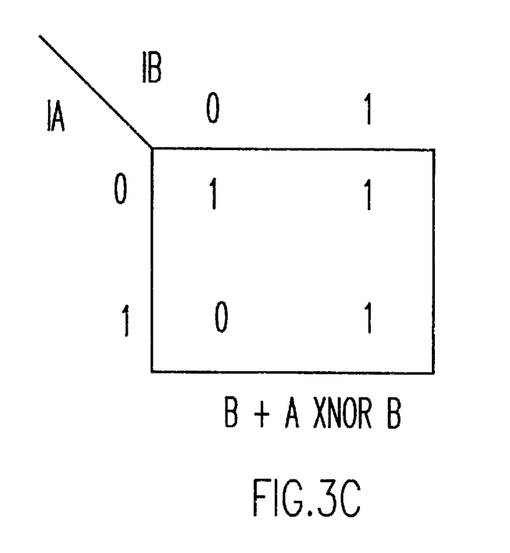
FIG. 3C is a truth table illustrating various outputs of the circuit shown in FIG. 3A given various inputs.

FIGS. 3B and 3C are truth tables which correspond to the chart illustrated above. Both FIGS. 3B and 3C show the results when various inputs are modified by the equations A+A XNOR B (FIG. 3B) and B+A XNOR B (FIG. 3C) by the circuit shown in FIG. 3A (where "+" means the logical OR operation). For example, as shown in the upper left corner of FIG. 3B, if a given bit of the A value (IA) is "0" and the same bit of B value (IB) is also "0", the result IA' will be "1". Specifically, the equation A+A XNOR B results in 0+1=1.

In operation, the circuit shown in FIG. 3A satisfies the truth tables shown in FIGS. 3B and 3C. Specifically, if, in accordance with the previous example, IA and IB are "0", transistors 311, 321, 331 and 341 will allow signals to pass. Transistor 311 allows a low IB signal to pass, which is inverted by inverter 300 to a high IA' output, again indicating that IA is "1". Transistor 331 allows the complement of IB (i.e., a "1") to pass, which is inverted by inverter 300 to output a low (i.e., "0") as the complement of the IA' signal. Transistors 321 and 341 similarly output the IB signal (and its complement) in accordance with the truth table shown in FIG. 3C. The remaining results illustrated in the truth table in FIGS. 3B and 3C are produced by the circuit shown in FIG. 3A, but will not be discussed herein for sake of brevity.

The converting means 200 could include, for example, four sets of the circuits illustrated in FIG. 3A. In such a structure, 16-bit input signals could be divided into 4-bit signals. Each 4-bit signal would be processed (one bit at a time) by the transistors 310–341 to convert the values A and B to A'0–3, A'4–7 . . . B'12–15.

Figure 4A:
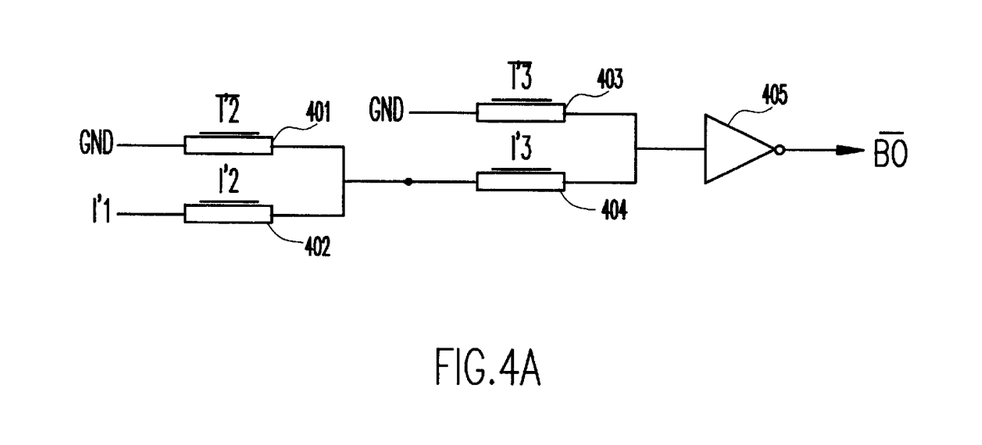
FIG. 4A is schematic block diagram of a circuit for determining the B0 value of the leading "1" position according to the invention.
Figure 4B:
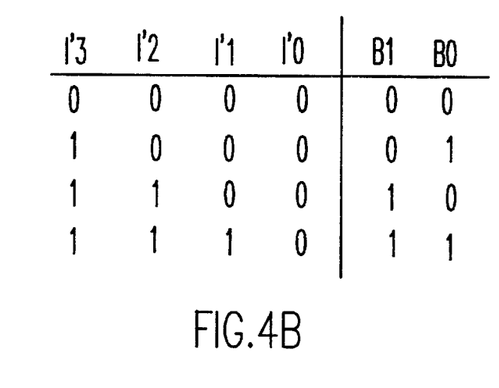
FIG. 4B is a chart illustrating the binary representation of leading "1" values for a 4-bit binary number.

FIG. 4A illustrates a circuit for determining the first digit (i.e., the B0 value) of the leading "1" position within each of the 4-bit segments A'0–3, A'4–7 . . . B'12– . . FIG. 4B is a chart showing the different binary results B1, B0 given different 4-bit values I'3, I'2, I'1 and I'0. The "Ø" result in FIGS. 4C, 5B, 8B and 9B represent "don't care" situations. In such "don't care" situations all bits are "1" and such a situation is accommodated by the multiplexors 205, 206.

More specifically, FIG. 4A illustrates pairs of transistors 401, 402 and 403, 404. Transistors 401, 402 allow the GND signal (i.e., "0") to pass when I'2 is "0" (i.e., when its complement is "1") and the I'1 signal to pass when I'2 is "1". Transistors 403, 404 allow the GND signal to pass when I'3 is "0" and the signal from transistors 401, 402 to pass when I'3 is "1".

Figure 4C:
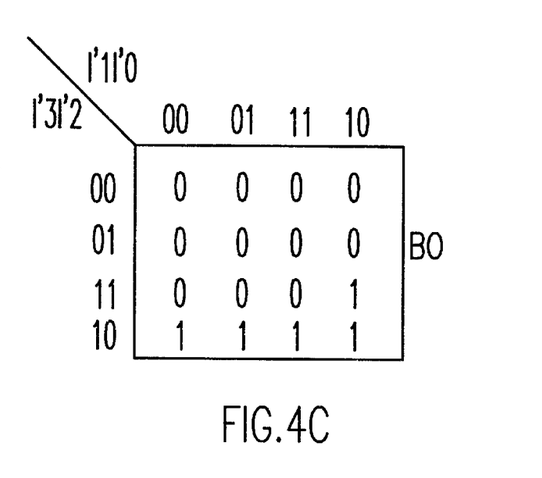
FIG. 4C is a truth table illustrating various outputs of the circuit shown in FIG. 4A given various inputs.

In operation, FIG. 4A produces the outputs illustrated in the truth table shown in FIG. 4C. For example, the upper left corner of the truth table in FIG. 4C indicates that B0 will be "0" when I'3–I'0 are "0". Given these inputs, transistor 403 will allow the GND signal to pass. This signal is inverted by inverter 405 to a "1", which is the complement of the B0 signal. The remaining results illustrated in the truth table in FIG. 4C are produced by the circuit shown in FIG. 4A, but will not be discussed herein for sake of brevity.

Figure 5A:
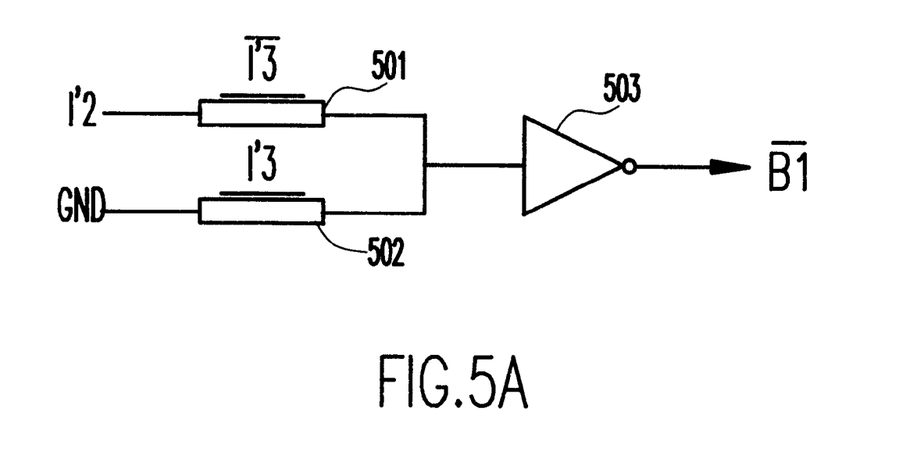
FIG. 5A is schematic block diagram of a circuit for determining the B1 value of the leading "1" position according to the invention.

FIG. 5A illustrates a circuit which determines the B1 value of the leading "1" position and includes transistors 501, 502 which alternatively allow the I'2 signal to pass when the I'3 signal is "0" and allow a GND (i.e., "0") signal to pass when the I'3 signal is "1". The circuit illustrated in FIG. 5A outputs the value for B1 as shown in the truth table of FIG. 5B.

Figure 5B:
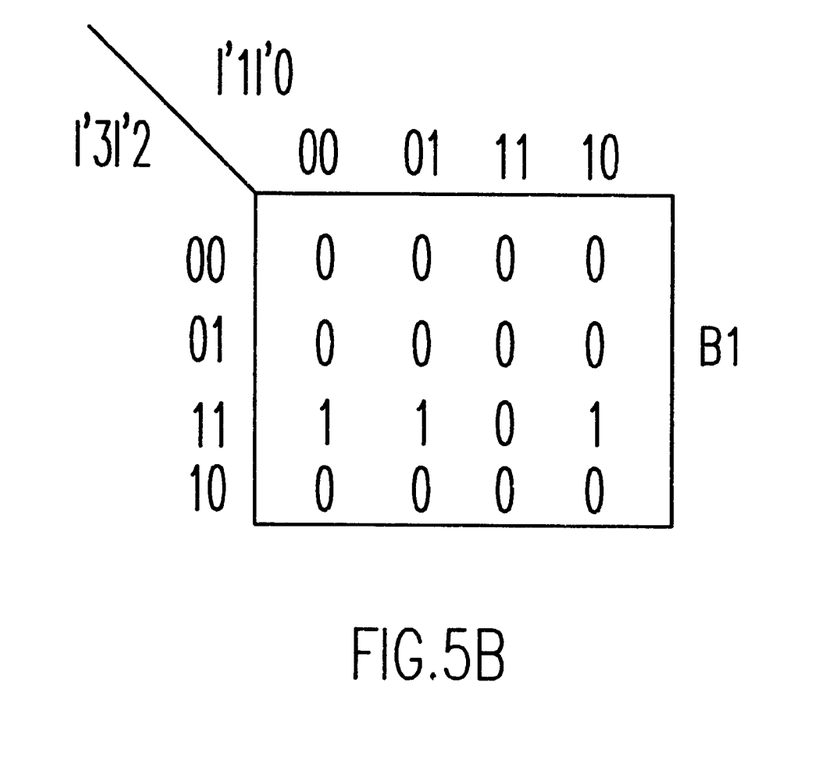
FIG. 5B is a truth table illustrating various outputs of the circuit shown in FIG. 5A given various inputs.

For example, as shown in the upper left corner of the truth table in FIG. 5B, if I'3–I'0 are all "0", B1 will be "0". In such a situation, transistor 501 will allow the I'2 signal to pass and be inverted into a "1", which is output by the circuit as the complement of the B1 signal. The remaining results illustrated in the truth table in FIG. 5B are produced by the circuit shown in FIG. 5A, but will not be discussed herein for sake of brevity.

The two-bit value B1, B0 is output from circuits 201, 202 for each of the 4-bit segments of the A and B values as BDA 0–3, BDA 4–7 . . . BDB 12–15 to circuits 203 and 204, as illustrated in FIG. 2.

FIG. 6 illustrates a circuit which checks for a condition where all values are "1" through the use of NAND circuits 601–604. A NAND circuit outputs a low (i.e., "0") signal only when all inputs thereto are high (i.e., "1").

In operation NAND circuit 601 receives the first 4 bits of the modified A' or B' signal (i.e., A'0–3). Only if all the bits within A'0–3 are "1", NAND circuit 601 will output a "low" signal representing the complement of the one detection signal for A'0–3 (i.e., ODA0–3).

Similarly, NAND circuits 602 perform a one detection function on the remaining 4-bit segments of the A' and B' values and output ODA 0–3, 0DA 4–7 . . . ODB 12–15 from circuits 201, 202 to circuits 203, 204, as illustrated in FIG. 2.

FIG. 7 illustrates a circuit that selects which of the binary digit signals BDA0–3, BDA4–7, BDA8–11 or BDA12–15 to propagate by transistors 701–706 and inverter 707.

Specifically, transistors 701, 702 alternatively allow the signal (which is reinverted by the output-inverter) of the binary digit BDA0–3 to pass when the one detect signal ODA4–7 is high and the complement of the binary digit BDA4–7 to pass then the one detect signal ODA4–7 is low. Transistor pairs 703, 704 and 705, 706 similarly allow the signals to pass for the higher order bits 8–15, as shown in FIG. 7.

In operation, when all bits are "1", circuits 205 and 206 of FIG. 2 will force BDA0–3 and/or BDB0–3 to zero.

Figure 8A:
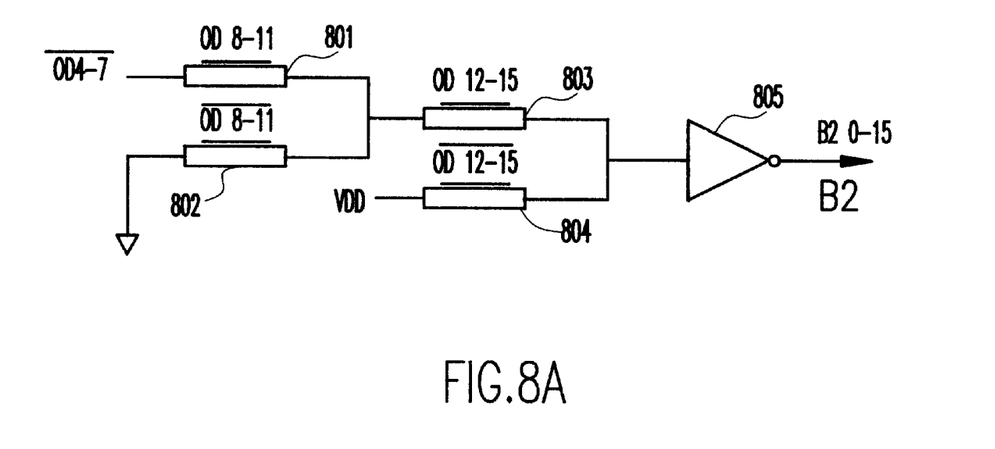
FIG. 8A is schematic block diagram of a circuit for determining the B2 value of the leading "1" position according to the invention.

FIG. 8A illustrates a circuit which determines the B2 bit of the leading "1" position value and includes transistors 801–804 and an inverter 805. Transistors 801, 802 alternatively allow the one detect signal OD4–7 to pass when the one detect signal OD8–11 is "1" or a ground (i.e., "0") to pass when the OD8–11 signal is "0". Transistors 803, 804 allow the signal from transistors 801, 802 to pass when signal OD12–15 is "1" and a high signal VDD (i.e., "1") to pass when signal OD12–15 is "0".

Figure 8B:
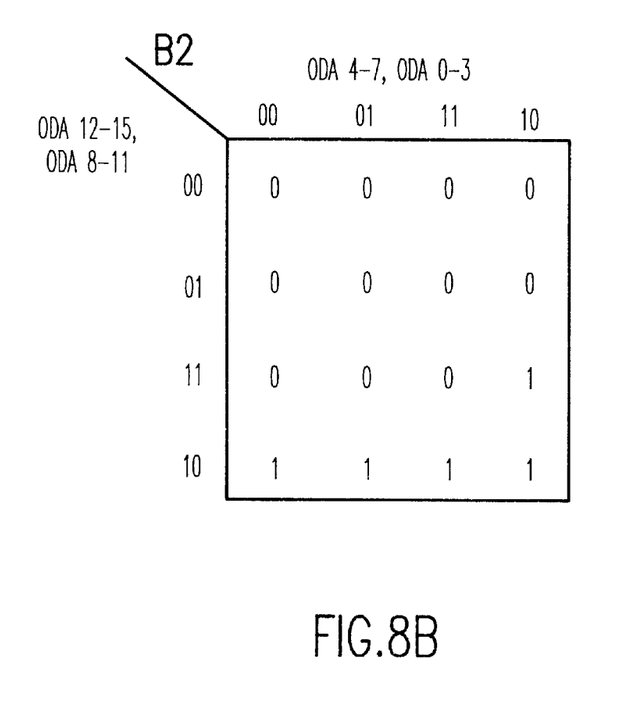
FIG. 8B is a truth table illustrating various outputs of the circuit shown in FIG. 8A given various inputs.

In operation, the circuit illustrated in FIG. 8A will output value B2 as illustrated in the truth table shown in FIG. 8B. For example, given the inputs in the upper left corner of the truth table, transistor 804 will allow a "1" to pass to inverter 805 which causes a "0" to be output as the B2 value. The remaining results illustrated in the truth table in FIG. 8B are produced by the circuit shown in FIG. 8A, but will not be discussed herein for sake of brevity.

Figure 9A:
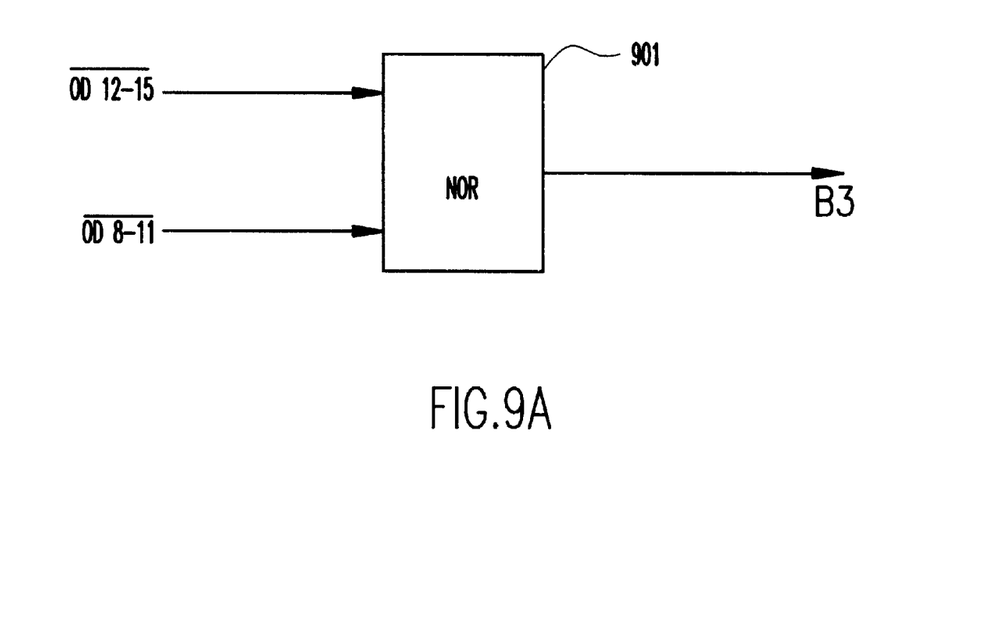
FIG. 9A is schematic block diagram of a circuit for determining the B3 value of the leading "1" position according to the invention.

FIG. 9A illustrates a circuit which determines the B3 bit of the leading "1" position and includes a NOR circuit 901. A NOR circuit outputs a low signal (i.e., "0") whenever either of the inputs is high (i.e., "1"). Therefore, if either the OD12–15 signal or the OD8–11 signal is "1", NOR circuit 901 will output a low signal.

Figure 9B:
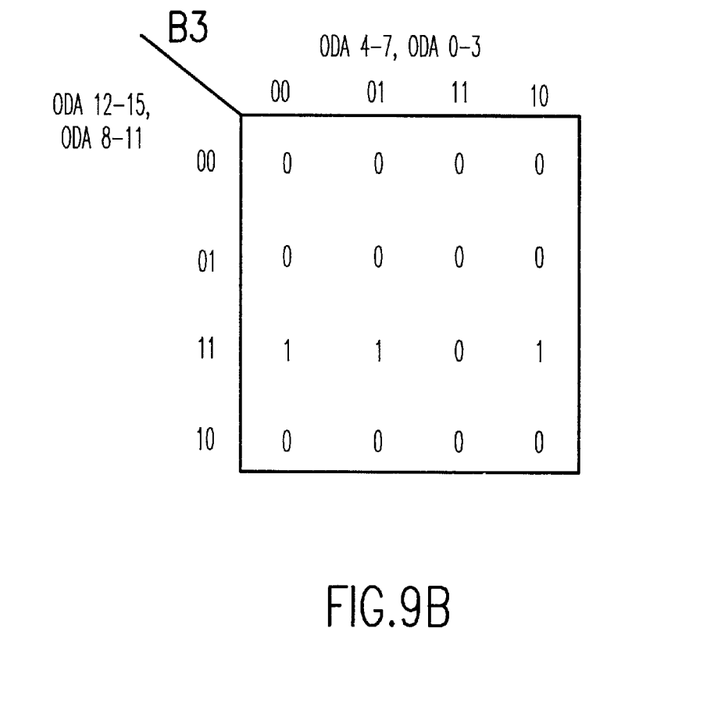
FIG. 9B is a truth table illustrating various outputs of the circuit shown in FIG. 5A given various inputs.

The possible results of the circuit in FIG. 9A are shown in the truth table in FIG. 9B. For example, the upper left corner of FIG. 9B indicates that all zero inputs to the NOR circuit 901 will produce a zero output. The remaining results illustrated in the truth table in FIG. 9B are produced by the circuit shown in FIG. 9A, but will not be discussed herein for sake of brevity.

Therefore, the circuits in FIGS. 4A, 5A, 8A and 9A determine the values for the position of the leading "1" for each of the 16-bit values A' and B'. As shown in FIG. 1, the binary number for the first 4-bit segment is represented only by B0 and B1. As discussed above, the circuits in FIGS. 4A and 5A determine values B0 and B1. The circuits in FIGS. 8A and 9A determine values B2 and B3, respectively.

The binary bit B2 is always "1" if the leading "0" occurs in bits 4–7 and 12–15, as shown in FIG. 1. Therefore, the circuit in FIG. 8A outputs B2 as a "1" when a "0" occurs in bits 4–7 or 12–15. Specifically, a high complement of the OD4–7 signal will indicate that a zero exists in bits 4–7. If bits 12–15 are not all "1", then transistor 804 passes the high voltage signal VDD, which is inverted by invertor 805, so that B2 is "0". If bits 12–15 are all "1" and the first "0" occurs in bits 8–11, transistor 802 passes a low signal (i.e., ground) through transistor 803 to inverter 805 so that B2 is a "1". If bits 8–15 are "1", then the circuit in FIG. 8A passes the signal OD4–7 through transistors 801 and 803 and inverter 805. This is also illustrated in FIG. 1.

Similarly, if the complement of the OD12–15 signal is high (indicating a "0" within bits 12–15), transistor 804 passes a high signal which in inverted to a low signal. This results in B2 being output as a "0" when the leading first "0" occurs in bits 12–15.

Similarly, the binary bit B3 is always "0" if the leading "0" occurs in bits 8–15, as shown in FIG. 1. Therefore, the circuit in FIG. 9A outputs B3 as a "0" when zeros are detected in either bits 8–11 or 12–15. If both the complements of the "all one" detection signals OD12–15 and OD8–11 are low, this indicates a condition where a "0" occurs in bits 8–12. In such a case NOR unit 901 will cause B3 to be output as a "0".

Therefore, circuit 203, 204 output the position of the leading "1" in the signals BA0–3 and BB0–3 by combining B0–B3 in a binary number for each of values A' and B'.

FIG. 10A illustrates a circuit for determining if BA'0–3 is greater than BB'0–3 and includes transistor pairs 1001, 1002; 1010, 1011; 1020, 1021; 1030, 1031 and 1040, 1041 and inverters 1050 and 1051.

In operation, transistors 1001, 1002 allow a high VDD signal to pass when the B'0 is high and allow the BA'0 signal to pass when the B'0 signal is low. The B'0 signal is the modified count of BA by B'=BA(0–3)+BA (0–3) XNOR BB(0–3), bit by bit. For example, when determining if B>A, B'=BB(0–3)+BA(0–3) XNOR BB(0–3). Such a calculation is performed in circuit 207 which is substantially similar to the circuit shown in FIG. 3A.

Transistor pair 1010, 1011 passes the signal from transistors 1001, 1002 when the B'1 signal is high and the B1A signal when the B'1 signal is low. Inverter 1050 inverts the signal from transistors 1010, 1011.

Transistor pair 1020, 1021 alternatively allow the signal from inverter 1050 to pass when the B'2 Signal is high and the complement of the B2A signal to pass when the B'2 signal is low.

Transistor pair 1030, 1031 passes the signal from transistors 1020, 1021 if the B'3 signal is high and passes the complement of the B3A signal if the B'3 signal is low.

Transistor pair 1040, 1041 passes the output from transistors 1030, 1031 when the ODA0–15 signal is low (i.e., when bits 0–15 of A' are not "all ones") and passes a high signal VDD when ODA0–15 is high (i.e., when bits 0–15 of A' are "all ones"). Inverter 1051 inverts the output of transistor pair 1040, 1041.

In operation, the circuit in FIG. 10A, will only output a high signal if BA0–3 is greater than BB0–3. Thus, the binary count of the number of leading ones in the modified field A' and B' are also compared. First, the same modification to the binary count for the A data is performed with B'=BA+BA XNOR BB. This modification enables the invention to differentiate between, for example, binary 5 (101) and binary 4 (100).

In operation, the high order bit of B' is selected first. If this high order bit is a "1" and both high order bits of the binary count BA and BB are the same, the invention examines the next lower bit. Similarly, if the high order bit is a "0" and the high order bits of the binary count BA and BB are different, the invention selects the high order bit of BA as A>B. To determine if B>A, the invention modifies BB as B'=BB+BA XNOR BB and follows the same procedure.

FIG. 10B illustrates a circuit for comparing BB'0–3 from BA'0–3 and producing a signal indicating A=B if the XNOR comparison of each bit position results all "1" values at each bit position. Specifically, the circuit in FIG. 10B includes a NAND unit 1060, an inverter 1061 and XNOR circuits 1070–1073.

The XNOR circuits 1070–1073 compare each bit of BB'0–3 from the corresponding bit of BA'0–3. The result of each equal operation is input to NAND unit 1060. If each of the outputs is high, NAND unit 1060 will output a low signal. This signal inverted by inverter 1061.

As discussed above, the size of the binary numbers which are compared is substantially less than that of the input values A and B. By reducing the number of bits being compared, the size of the circuit can be reduced, saving time and chip area. For instance, for a 16 bit input field, the binary number indicating the position of the leading "1" will be a 5 bit field.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A comparator comprising:
   a first circuit for inputting comparison values to be compared;
   a plurality of second circuits, connected to said first circuit, for determining a number of a leading "1" in each of said comparison values and outputting position values, wherein said position values have a bit size smaller than that of said comparison values; and
   a third circuit, connected to said second circuits, for determining whether a first position value of said position values corresponding to a first comparison value of said comparison values is one of greater than a second position value of said position values corresponding to a second comparison value of said comparison values, equal to said second position value and less than said second position value.

2. A comparator as in claim 1, wherein said first circuit includes a circuit for modifying said comparison values based on an XNOR operation and outputting modified values.

3. A comparator as in claim 2, wherein said XNOR operation is based on the following equation: A'=A+A XNOR B, wherein A' comprises a modified value of said modified values, A comprises a first comparison value of said comparison values and B comprises a second comparison value of said comparison values.

4. A comparator as in claim 1, wherein said second circuits each comprise:
   a first circuit for determining a first binary portion of said position values based on a 4-bit segment of one of said comparison values; and
   a second circuit for selecting said binary portion and for determining a second binary portion of said position values.

5. A comparator as in claim 1, wherein said second circuit includes a multiplexor for setting a position value of said position values equal to zero when a comparison value of said comparison values comprises all ones.

6. A comparator as in claim 1, further comprising a fifth circuit, connected to said second circuit, for modifying said position values based on an XNOR operation and outputting modified position values to said third circuit.

7. A comparator comprising:
   means for inputting comparison values to be compared;
   first means, connected to said inputting means, for determining a leading "1" position in each of said comparison values and outputting position values, wherein said position values have a bit size smaller than said comparison values;
   second means, connected to said first determining means, for determining whether a first position value of said position values is one of greater than a second position value of said position values, equal to said second position value and less than said second position value.

8. A comparator as in claim 7, wherein said inputting means includes means for modifying said comparison values based on an XNOR operation and means for outputting modified values.

9. A comparator as in claim 8, wherein said XNOR operation is based on the following equation: A'=A+A XNOR B, wherein A' comprises a modified value of said modified values, A comprises a first comparison value of said comparison values and B comprises a second comparison value of said comparison values.

10. A comparator as in claim 7, wherein said first determining means comprises:

third means for determining a first binary portion of said position values based on a 4-bit segment of one of said comparison values; and means for selecting said binary portion and for determining a second binary portion of said position values.

11. A comparator as in claim 7, wherein said first determining means includes a multiplexor for setting a position value of said position values equal to zero when a comparison value of said comparison values comprises all ones.

12. A comparator as in claim 7, further comprising means, connected to said first determining means, for modifying said position values based on an XNOR operation and outputting modified position values to said third circuit.

13. A comparator as in claim 7, wherein said first position value corresponds to a first comparison value of said comparison values and said second position value corresponds to a second comparison value of said comparison values.

14. A method for comparing values:

inputting two comparison values to be compared;

determining a number of a leading "1" in each of said comparison values and outputting position values, wherein said position values have a bit size smaller than said comparison values;

comparing a first position value of said position values with a second position value of said position values; and outputting a signal indicating whether a first comparison value of said comparison values is one of greater than a second comparison value of said comparison values, equal to said second comparison value and less than said comparison value based on a result of said comparing step.

15. A method as in claim 14, wherein said step of inputting includes steps of modifying said comparison values based on an XNOR operation and outputting modified values.

16. A method as in claim 15, wherein said XNOR operation is based on the following equation: A'=A+A XNOR B, wherein A' comprises a modified value of said modified values, A comprises a first comparison value of said comparison values and B comprises a second comparison value of said comparison values.

17. A method as in claim 15, wherein said determining step comprises:

a second step of determining a first binary portion of said position values based on a 4-bit segment of one of said comparison values;

a step of selecting said binary portion; and a third step of determining a second binary portion of said position values.

18. A method as in claim 14, wherein said determining step includes a step of setting a position value of said position values equal to zero when a comparison value of said comparison values comprises all ones.

19. A method as in claim 14, further comprising a steps of modifying said position values based on an XNOR operation and outputting modified position values prior to said comparing step.

20. A method as in claim 14, wherein said bit size of said comparison values is 16 bits and said bit size of said position values is 5 bits.

* * * * *